(12) United States Patent
Wayne et al.

(10) Patent No.: US 9,236,939 B2
(45) Date of Patent: Jan. 12, 2016

(54) ATMOSPHERIC TRANSMISSOMETER USING A MODULATED OPTICAL SOURCE

(71) Applicant: The United States of America as represented by the Secretary of the Navy, San Diego, CA (US)

(72) Inventors: David T. Wayne, San Diego, CA (US); Colin N. Reinhardt, Santee, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 42 days.

(21) Appl. No.: 14/296,261

(22) Filed: Jun. 4, 2014

(65) Prior Publication Data

US 2015/0358077 A1 Dec. 10, 2015

(51) Int. Cl.
*H04B 10/00* (2013.01)
*H04B 10/079* (2013.01)

(52) U.S. Cl.
CPC ...... *H04B 10/0795* (2013.01); *H04B 10/07955* (2013.01)

(58) Field of Classification Search
USPC .......................................... 398/118–131, 25
See application file for complete search history.

(56) References Cited

U.S. PATENT DOCUMENTS

| | | | |
|---|---|---|---|
| 4,469,443 A | 9/1984 | Geller | |
| 5,029,306 A * | 7/1991 | Bull | H01Q 3/2676 342/368 |
| 5,444,530 A * | 8/1995 | Wang | G01N 21/59 250/573 |
| 5,592,157 A * | 1/1997 | Metz | G01S 7/497 340/601 |
| 5,796,105 A * | 8/1998 | Wang | G01N 21/41 250/338.5 |
| 6,239,889 B1 * | 5/2001 | Harley | H04J 14/02 398/124 |
| 6,347,001 B1 * | 2/2002 | Arnold | H04B 10/118 398/122 |
| 6,807,375 B2 * | 10/2004 | Dogariu | H04B 10/1121 398/118 |
| 6,914,674 B1 * | 7/2005 | Wang | G01N 21/532 250/573 |
| 7,068,362 B2 * | 6/2006 | Murdock | G01N 21/538 356/218 |
| 7,122,820 B2 * | 10/2006 | Engel | G01N 15/0205 250/574 |
| 7,146,105 B1 * | 12/2006 | Tzeng | H04B 10/1127 398/118 |

(Continued)

OTHER PUBLICATIONS

Ishimaru, A., "Wave Propagation and Scattering in Random Media and Rough Surfaces," Proc. of the IEEE, vol. 79, No. 10, pp. 1359-1366, 1991.

(Continued)

*Primary Examiner* — Agustin Bello
(74) *Attorney, Agent, or Firm* — SPAWAR Systems Center Pacific; Kyle Eppele; Ryan J. Friedl

(57) ABSTRACT

A system and method involve detecting a modulated optical signal from an atmospheric propagation channel, wherein the modulated optical signal comprises an optical signal from an optical source modulated with a periodic signal at a modulation frequency greater than the bandwidth of the turbulence within the atmospheric propagation channel, and converting the detected modulated optical signal into a digitized electrical signal. The method also includes determining the root mean square signal power of an AC component of the digitized electrical signal at the modulation frequency. The method further includes determining the power spectral density of the digitized electrical signal, determining the magnitude of the peak component at the modulation frequency, and determining the effective optical depth of the atmospheric propagation channel using the magnitude of the peak component at the modulation frequency.

12 Claims, 7 Drawing Sheets

(56) References Cited

U.S. PATENT DOCUMENTS

| | | | |
|---|---|---|---|
| 7,343,099 B2 * | 3/2008 | Wirth | G02B 26/06 398/123 |
| 7,437,077 B2 * | 10/2008 | Wirth | G02B 26/06 250/201.9 |
| 7,457,545 B2 * | 11/2008 | Wirth | H04B 10/1125 250/201.9 |
| 2003/0095302 A1 * | 5/2003 | Schuster | H04B 10/1121 398/164 |
| 2003/0231887 A1 * | 12/2003 | Grassi | H04B 10/1127 398/130 |
| 2004/0120718 A1 * | 6/2004 | Verbana | H04B 10/1121 398/119 |
| 2006/0024061 A1 * | 2/2006 | Wirth | H04B 10/1125 398/129 |
| 2007/0077071 A1 * | 4/2007 | Belenkiy | G01S 17/023 398/130 |
| 2014/0248048 A1 * | 9/2014 | Northcott | H04B 10/1125 398/25 |

OTHER PUBLICATIONS

Reinhardt, C.N., Jaruwatanadilok, S., Kuga, Y., and Ishimaru, A., "Improving bit-error-rate performance of teh free-space optical communications system with channel estimation based on radiative transfer theory," IEEE Journal on Selected Areas in Communication, vol. 27, No. 9, pp. 1591-1598, 2009.

Vilcheck, M.J., "Atmospheric transmission from an instrument measuring scatter at 1550 nm," Proc. SPIE 8732, May 17, 2013.

Wayne, D.T. et al., "Observation and analysis of aero-optic effects on the ORCA laser communication system," Proc. SPIE 8038, Feb. 1, 2012.

* cited by examiner

ATMOSPHERIC TRANSMISSOMETER USING A MODULATED OPTICAL SOURCE

FEDERALLY SPONSORED RESEARCH AND DEVELOPMENT

The Atmospheric Transmissometer Using a Modulated Optical Source is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 102357.

BACKGROUND

The transmission of the atmosphere along a path is defined as the amount of light that is not lost due to molecular scattering and/or absorption or newly created by emitting sources within the path. The transmission of the atmosphere is dependent on observation wavelength and path length, along with the molecular, aerosol, and particulate composition. A transmissometer is an instrument used to measure transmission of the atmosphere at a particular wavelength over a path. A transmissometer is particularly useful for characterizing propagation paths for laser systems. The transmission of the atmosphere effects how much light will actually reach the intended target. This metric is important in designing free-space optical and infrared systems such as laser radar, laser communications, laser range finders, etc. Transmissometers can also be used to measure molecular scattering in gas samples and attenuation in material samples.

Current transmissometer designs can be physically bulky, electronically complex, and susceptible to noise interference which limits dynamic range. A transmissometer design that reduces complexity and size, weight, and power (SWAP), improves noise resiliency, and increases signal-to-noise (SNR) ratio and dynamic range is highly desirable.

DETAILED DESCRIPTION OF SOME EMBODIMENTS

Figure 1:
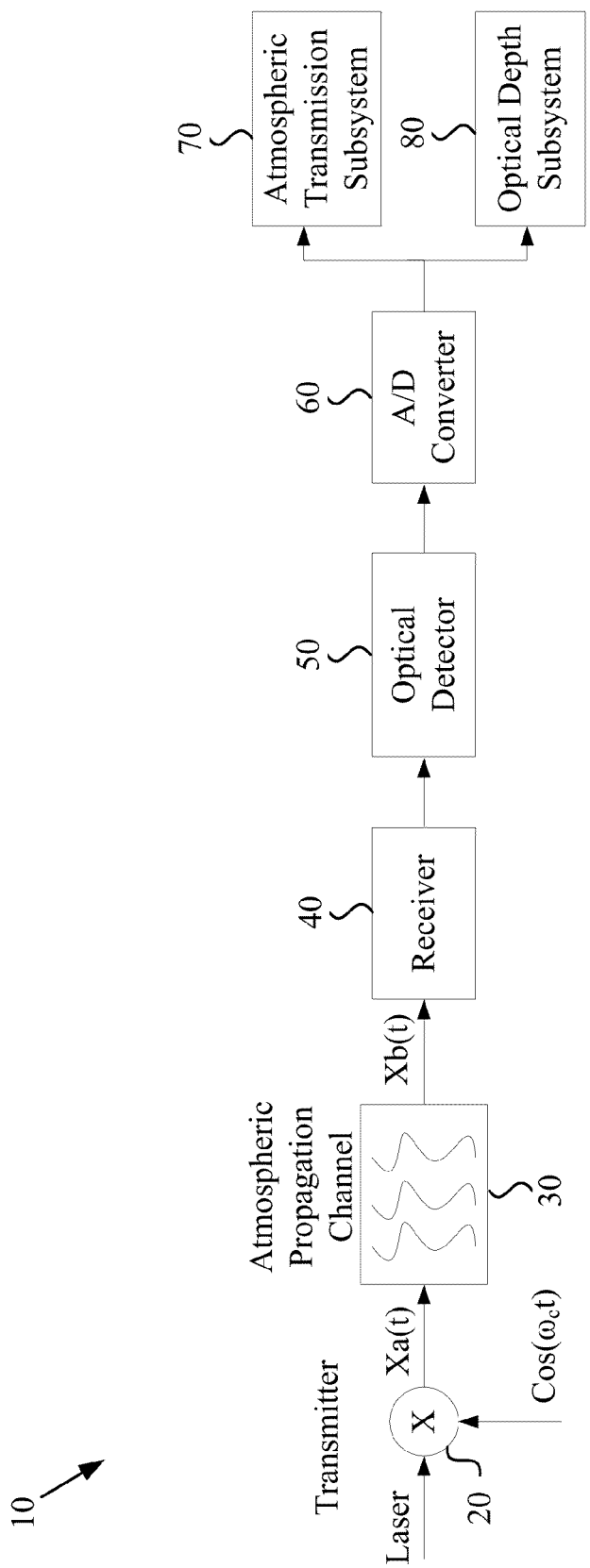
FIG. 1 shows a block diagram of an embodiment of a system in accordance with the Atmospheric Transmissometer Using a Modulated Optical Source.

Reference in the specification to "one embodiment" or to "an embodiment" means that a particular feature, structure, or characteristic described in connection with the embodiments is included in at least one embodiment of the invention. The appearances of the phrases "in one embodiment", "in some embodiments", and "in other embodiments" in various places in the specification are not necessarily all referring to the same embodiment or the same set of embodiments.

The embodiments of the system disclosed herein provide a transmissometer design based upon a modulated laser source and an AC-coupled receiver. The transmissometer design aims to reduce both complexity and SWaP through the use of a high frequency modulation technique, while ultimately improving signal-to-noise ratio (SNR) and measurement range over a variety of atmospheric conditions.

The Beer-Lambert law relates the transmission T (or transmissivity) of light to the properties of the material through which light is traveling, and is given by the equation $$T = \frac{I(\beta, L)}{I_0} = e^{-\beta L} \quad (\text{Eq. 1})$$

where $\beta$ is the atmospheric extinction coefficient [m$^{-1}$] representing the absorptive and scattering characteristics of the transmission medium, L is the optical path length of propagation through the random medium (meters), $I_0$ is the initial incident intensity (or power), and $I(\beta, L)$ is the received attenuated intensity (or power) after propagating along a path of length L through a medium characterized by $\beta$. This law describes the exponential decrease in transmission as a function of both atmospheric extinction $\beta$ and propagation path length L.

The optical depth $\tau$ is an important parameter characterizing the atmospheric optical visibility conditions. The optical depth is a dimensionless parameter, defined as $$\tau = \rho \langle \sigma_t \rangle L \quad (\text{Eq. 2})$$

where $\rho$ is the particle number density (# particles/m$^3$), and $\langle \sigma_t \rangle = \langle \sigma_s + \sigma_a \rangle$ is the total extinction (scattering+absorption) cross-section averaged over all particles in the aerosol/particulate size-distribution function (SDF), with units of area [m$^2$]. The optical depth $\tau$ is related to the extinction coefficient through the expression $$\tau = \beta L. \quad (\text{Eq. 3})$$

It follows that $\beta = \rho \langle \sigma_t \rangle$. Accordingly, knowledge of the optical depth and the optical path length implies knowledge of the atmospheric extinction coefficient. Using the optical depth, the Beer-Lambert law defining the exponential decay of transmissivity can be expressed equivalently as $$T = e^{-\tau}. \quad (\text{Eq. 4})$$

The typical setup of a transmissometer includes an optical transmitter (source) and an optical receiver separated by 10's to 1000's of meters. A known power is transmitted from the source and using standard laser beam propagation equations, the anticipated received power can be calculated, assuming no loss. The ratio between expected received power and actual received power is then due to the attenuation of the atmosphere.

When a laser beam is modulated at some frequency, part of the DC signal power is shifted to the modulation frequency. The power at the modulation frequency is proportional to the amplitude of the modulated laser beam. The received power at the modulation frequency is recovered by filtering and taking the root mean-square (RMS) of the received signal.

FIG. 1 shows a block diagram of an embodiment of a system 10 in accordance with the Atmospheric Transmissometer Using a Modulated Optical Source. A beam from a laser, such as a continuous wavelength laser, with output power $I_0$ is modulated, at mixer 20, with a sinusoidal signal $$x_c(t) = \frac{1}{2} I_0 [1 + \cos(\omega_c t)] \quad [W] \tag{Eq. 5}$$

where $\omega_c = 2\pi f_c$ is the radial modulation frequency and t is time. The signal goes from 0 to $I_0$ and has a mean DC value of $I_0/2$. The use of a laser instead of a lamp yields more control over the source, i.e. beam divergence, wavelength, and stability. The modulated signal may be either a basic sinusoidal waveform or another periodic waveform such as square-wave or sawtooth. In some embodiments, because the waveform is sinusoidal instead of a square wave, a higher modulation frequency can be used while still maintaining the fidelity of the waveform. The modulation frequency is high enough such that it is not in the band of the atmospheric turbulence induced signal fluctuations.

The modulated laser signal is then propagated through the atmosphere in an atmospheric propagation channel 30 by a transmitter. In some embodiments, the transmitter is electrically modulated and does not require a chopper wheel. If a modulation frequency is selected that is much higher than the bandwidth of the atmosphere, the modulated laser signal will act like a carrier that has been amplitude modulated by the atmosphere. As the typical bandwidth of the atmosphere is less than 1 kHz, in practice the carrier frequency should be at least ten times the message, so a suitable modulation frequency is about 10 kHz. However, a modulation frequency in the range of 100 Hz to 100 GHz may be used.

The optical signal Xb(t) is received by receiver 40, which in some embodiments comprises a telescope with a narrowband optical bandpass filter focused on a detector. Since the signal is modulated, receiver 40 may be AC coupled, and in turn, be insensitive to the DC sky background. Receiver 40 does not require a lock-in amplifier, phase-locked loop, or any complex demodulation hardware and therefore can tolerate drift in the modulation frequency. In some embodiments, the data processing at receiver 40 may be implemented all in hardware, yielding a low SWaP system.

The received signal is sampled and digitized at adequate sample-rate and bit-depth. For each data retrieval, multiple waveforms will be sampled (at user-configurable waveform duration and sampling rate) within a time period such that the atmospheric conditions change negligibly and may be considered quasi-static (time-invariant). This will allow averaging over several consecutive waveforms to reduce noise, improve SNR, and smooth out spurious fluctuations of signal power level.

The optical signal incident on an optical detector 50 contains both DC and AC signal components. A high sensitivity optical detector 50, such as a commercially available avalanche photodiode detector, may be used to detect signal levels down to femtowatts. The DC component is a sum of solar background light and the transmitted optical signal. The AC component is due to the modulated transmitted optical signal and fluctuations of the transmitted optical signal due to atmospheric turbulence. Optical detector 50 converts the optical signal to an electrical current. The electrical current is amplified and converted to a voltage with a trans-impedance amplifier (TIA). At the output stage of the TIA a capacitor is placed in series to act as a high pass filter. This configuration blocks the DC signal component and only allows the AC signal component. The AC-coupled output of the detector/ amplifier circuit 50 is input into an analog-to-digital converter (ADC) 60, also called a digitizer, which may comprise any commercially available ADC.

ADC 60 samples at a minimum rate of the Nyquist frequency. In some embodiments, ADC 60 may have a higher sampling rate, such as ten times the modulation frequency, to yield better signal representation. The bit depth of digitization will determine the dynamic range. Therefore, a larger bit depth will yield a more accurate system and increased SNR. After the signal is digitized, the received signal exists in software and can be further processed such as via atmospheric transmission subsystem 70 and/or optical depth subsystem 80.

Figure 2:
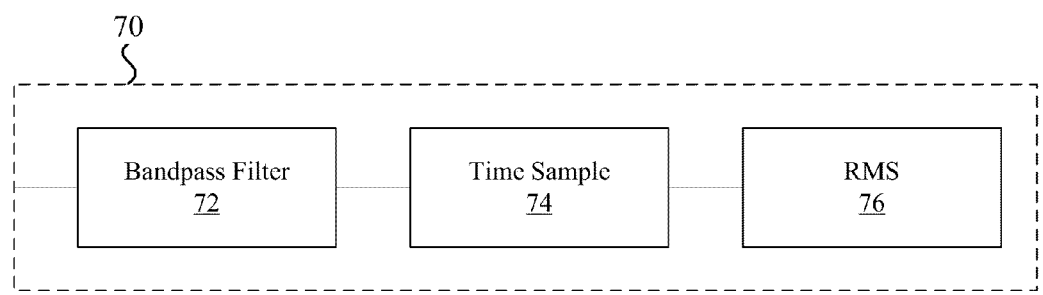
FIG. 2 shows a block diagram of an embodiment of an atmospheric transmission sub-system of the system shown in FIG. 1.

FIG. 2 shows a block diagram of an atmospheric transmission subsystem 70. The incoming signal is filtered with a bandpass filter 72 to further isolate the signal band of interest. As an example, the bandpass filter is centered at the modulation frequency of about 10 kHz with a bandwidth of about 2 kHz. In some embodiments, this is implemented with a seventh-order Butterworth filter, but could be any type of bandpass filter. In some embodiments, the bandpass filter may be tuned/optimized based on a different set of prioritized constraints, such as different modulation frequency, bandwidth, or to be adaptive.

After bandpass filter 72, the signal is still a zero-mean AC signal. Further processing of the signal involves statistical analysis and therefore a time interval is defined for the signal using time sample processing circuitry 74. A sample time of $t_{samp}$ seconds is chosen, however this time period can be changed. The time-sampled signal is squared to make the signal all positive. The mean of the square of the time-sampled signal is taken to yield the mean-square of the signal. Finally, the square root of the mean-square signal is taken using root mean square (RMS) processing circuitry 76 to yield the RMS. The RMS of the time-sampled signal scaled by some calibration factor is the received optical power from the transmitter. In other words, the processed signal is a linearly scaled value of the transmitted power. As an example, time sample processing circuitry 74 and RMS processing circuitry 76 may be separate circuits within the same processor, may comprise separate software functions coded within the same processor, or may comprise separate processors.

In non-ideal atmospheric conditions of reduced visibility, by computing the power spectral density (PSD) of the received waveform and extracting the magnitude of the peak component at the fundamental modulating frequency $f_0$, which is designated as $S_{atmos}(f_0)$, a ratio is formed of this value with the magnitude of the fundamental PSD component from a reference waveform taken in optimal clear-visibility conditions, $S_{clear}(f_0)$, based on the Lambert-Beer Law equation for absorption of light $$S_{atmos}(f_0) = S_{clear}(f_0) e^{-\tau_{eff}} \tag{Eq. 6}$$

where $\tau_{eff}$ is denoted the effective value of the optical depth in the reduced-visibility channel. This equation is valid for the coherent component of the transmitted intensity when the field-of-view (FOV) of the receiver is narrow enough to admit only the direct coherent component and not the scattered incoherent intensity. The equation can be solved to yield an estimate of the effective optical depth, given field-measurement intensity levels of the fundamental harmonic components in clear and reduced-visibility conditions, $$\tau_{eff} = \ln [S_{clear}(f_0)/S_{atmos}(f_0)]. \tag{Eq. 7}$$

This result is used to estimate the effective optical depth $\tau_{\it eff}$. Various practical methods for computing the power-spectrum (PSD) may be utilized, based on desired accuracy, computational efficiency, and speed.

As visibility conditions decrease and optical depth values correspondingly increase the direct coherent component of the received intensity decreases and the scattered incoherent component increases, up to the point where both are of comparable levels. This occurs in the range of $3 \leq \tau_{\it eff} \leq 5$. As optical depth increases further, $\tau_{\it eff} > 5$, the coherent component becomes negligible and the multiply-scattered incoherent intensity dominates. In these regimes, using the magnitude of the coherent component as described above no longer works, due to attenuation and spreading/dispersion of the signal from multiple-scattering and multipath effects. In these regimes the proposed system will switch to a technique of integration of the total power contained within a bandwidth around the fundamental frequency $f_0$.

Figure 3:
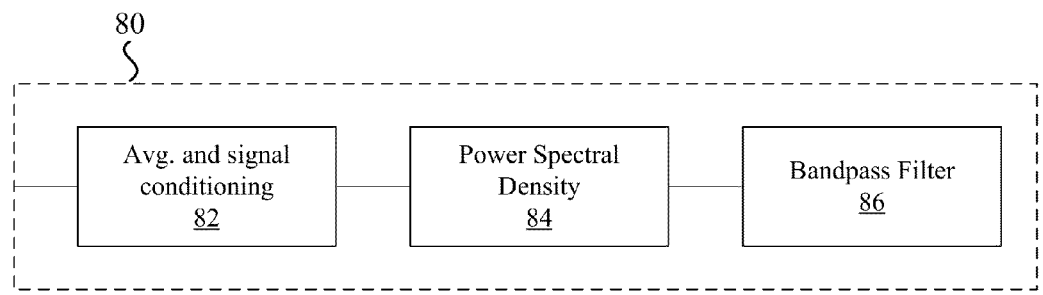
FIG. 3 shows a block diagram of an embodiment of an optical depth sub-system of the system shown in FIG. 1.

FIG. 3 shows a block diagram of optical depth subsystem 80. Subsystem 80 is used to obtain an atmospheric optical depth measurement. Averaging and pre-conditioning circuitry 82 provides initial averaging and pre-conditioning of the digitized signal to reduce undesired noise, bias, and other artifacts. Power spectral density (PSD) processing circuitry 84 provides a PSD calculation. Bandpass filter 86 provides extraction of the fundamental signal component using bandpass filtering. As an example, averaging and pre-conditioning circuitry 82 and PSD processing circuitry 84 may be separate circuits within the same processor, may comprise separate software functions coded within the same processor, or may comprise separate processors.

As described above, either the peak magnitude of the fundamental PSD component or the integrated signal power within a bandwidth around the fundamental frequency may be computed based on the optical depth regime and relation between coherent and incoherent intensity components. Additionally, in some embodiments the system always computes both values and performs a comparison of the two quantities to help determine the optical depth regime which the system is operating in, as well as to provide a self-check mechanism for proper system operation.

System 10 allows for measuring the atmospheric optical depth along horizontal terrestrial paths, which is affordable, has reduced SWaP, and is relatively straight-forward to operate. In some embodiments, all the data processing in system 10, such as the processing performed in subsystems 70 and 80, may be implemented in hardware, such as a FPGA, while in other embodiments the processing is performed using a computer. Further, while in some embodiments the data processing algorithm uses standard functions such as Fourier transforms and Bessel filters, the order in which the functions are executed on the received signal and the parameters of the filters are unique to yield an accurate result.

Figure 4:
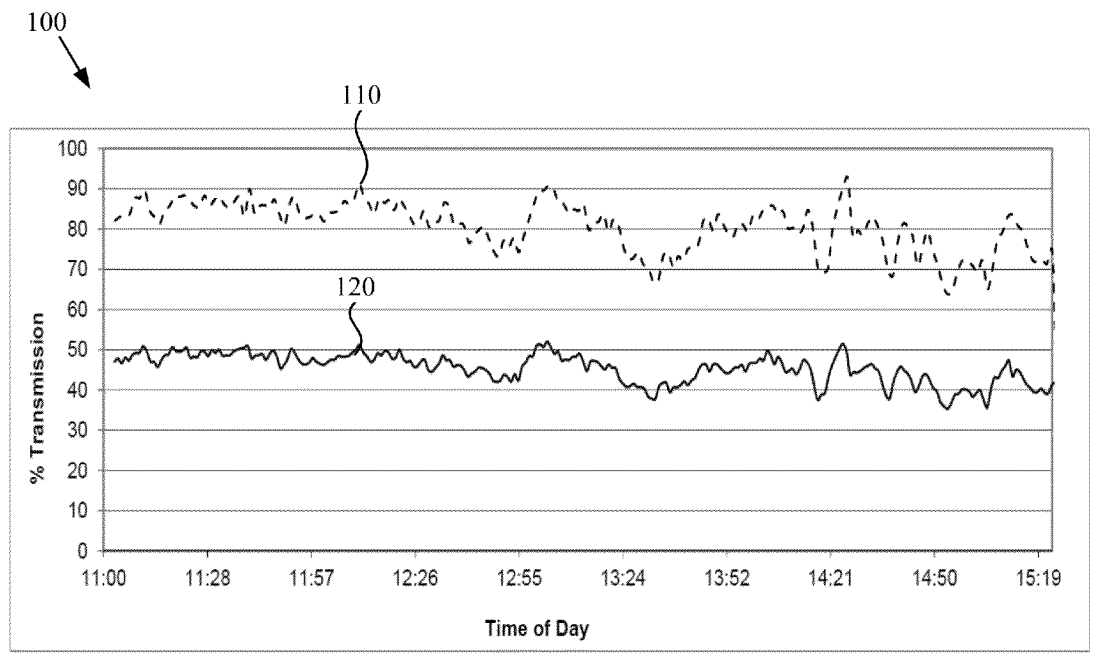
FIGS. 4-6 show graphs illustrating data collection results using a commercial transmissometer and the system shown in FIG. 1.
Figure 5:
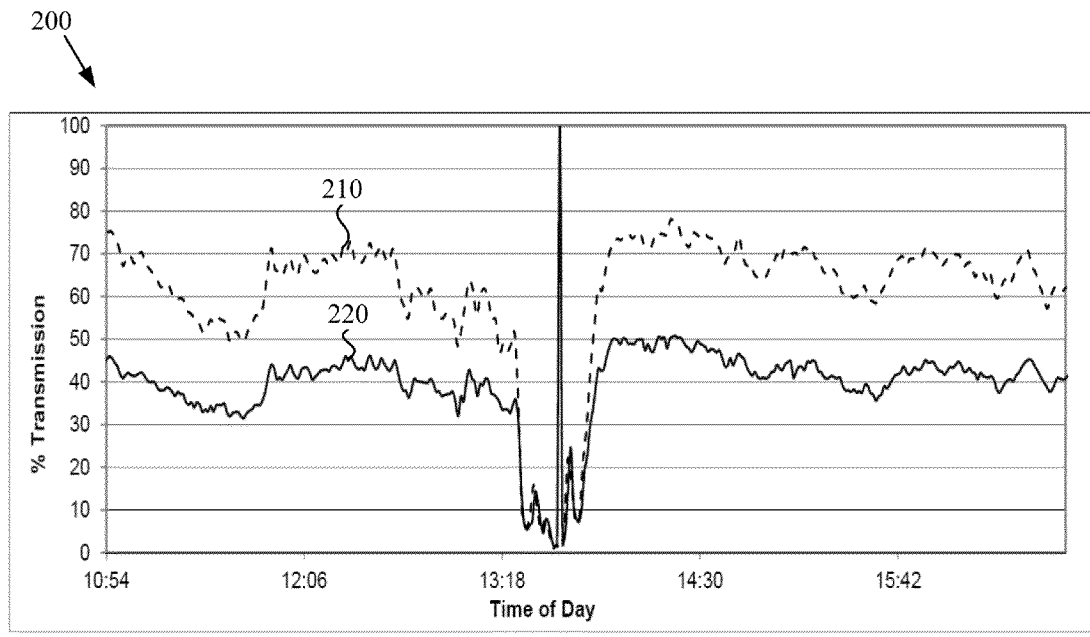
Figure 6:
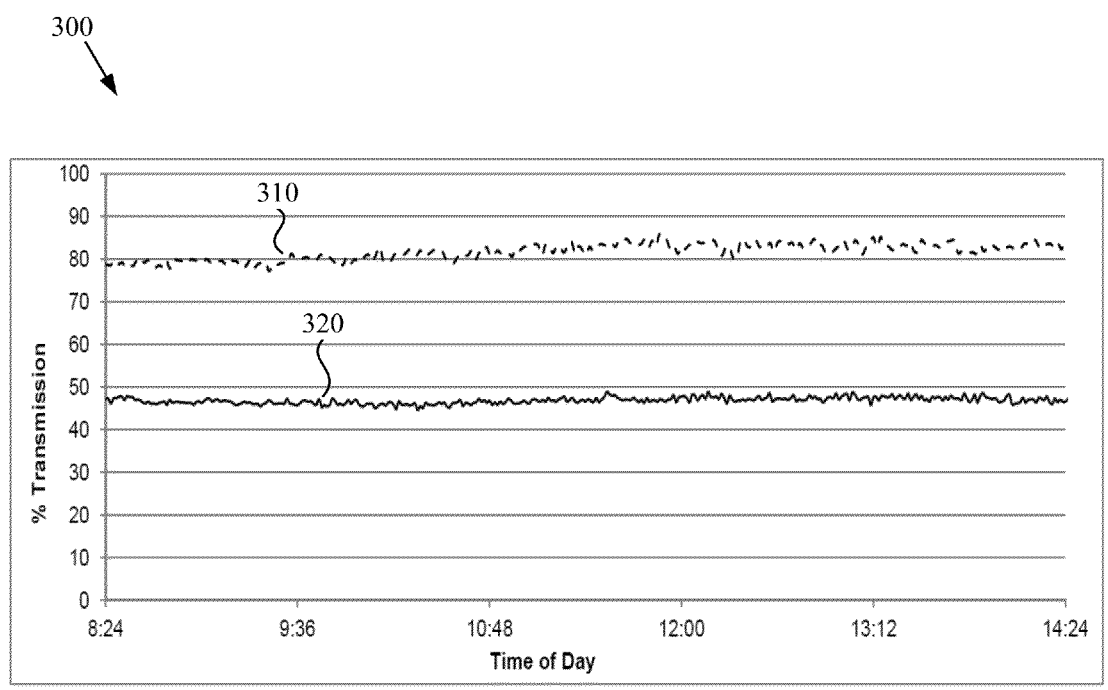

FIGS. 4-6 show graphs illustrating data collection results using a commercial transmissometer and system 10. FIG. 4 shows a graph 100 of data collected over a 700 m horizontal terrestrial path near the ocean. Line 110 represents the data collected during a mostly clear day in winter using system 10, while line 120 represents data collected using an Optec LPV-3 commercial transmissometer. The Optec transmissometer was configured to measure transmission at 1040 nm, while system 10 was configured to measure transmission at 850 nm. FIG. 5 shows a graph 200 of data collected during an overcast and slightly hazy day with a substantial fog bank appearing later in the day, where line 210 represents the data collected using system 10 and line 220 represents data collected using the Optec transmissometer. FIG. 6 shows a graph 300 of data collected during a clear day in the springtime, where line 310 represents the data collected using system 10 and line 320 represents data collected using the Optec transmissometer.

Figure 7:
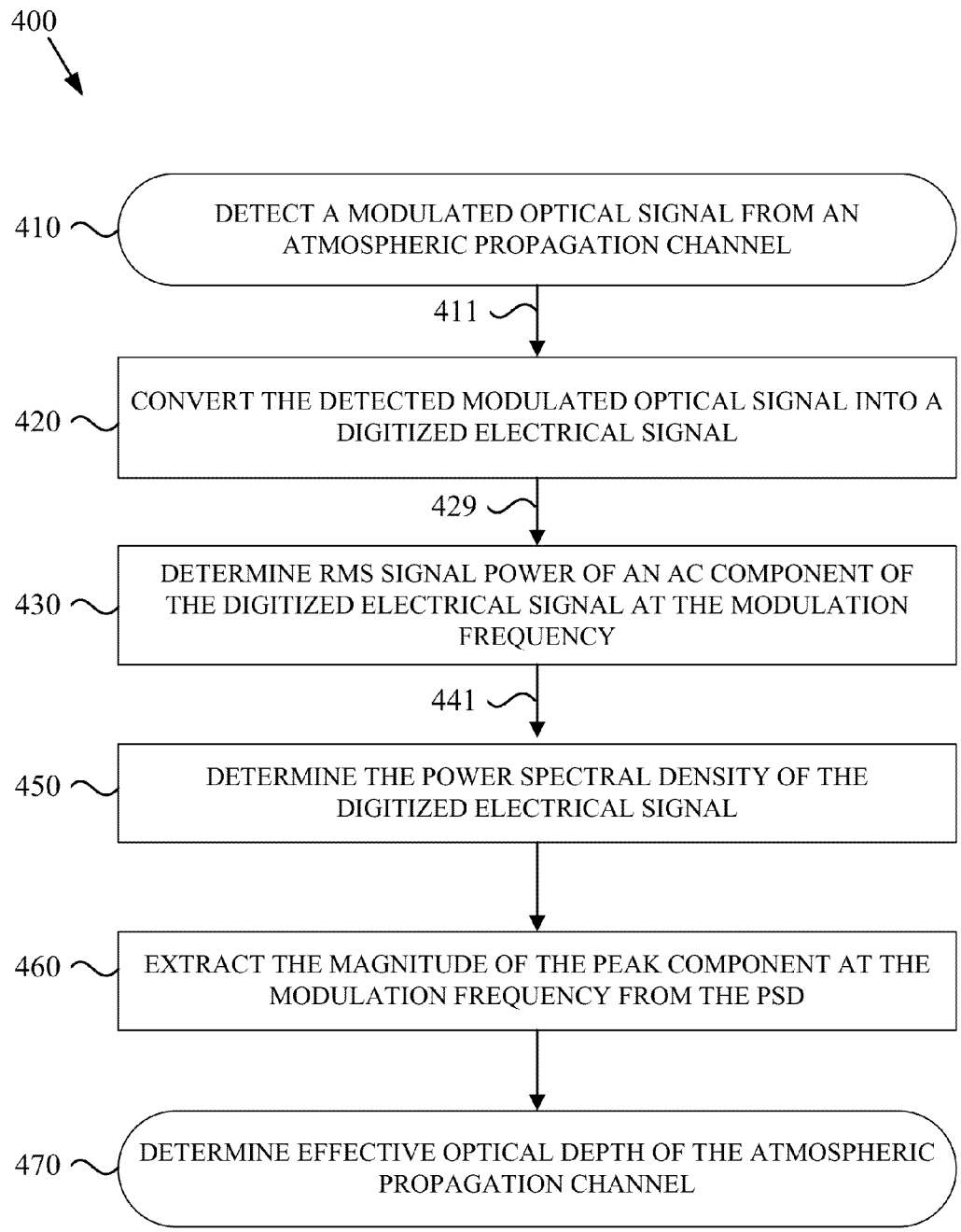
FIG. 7 shows a flowchart of an embodiment of a method in accordance with the Atmospheric Transmissometer Using a Modulated Optical Source.
Figure 8:
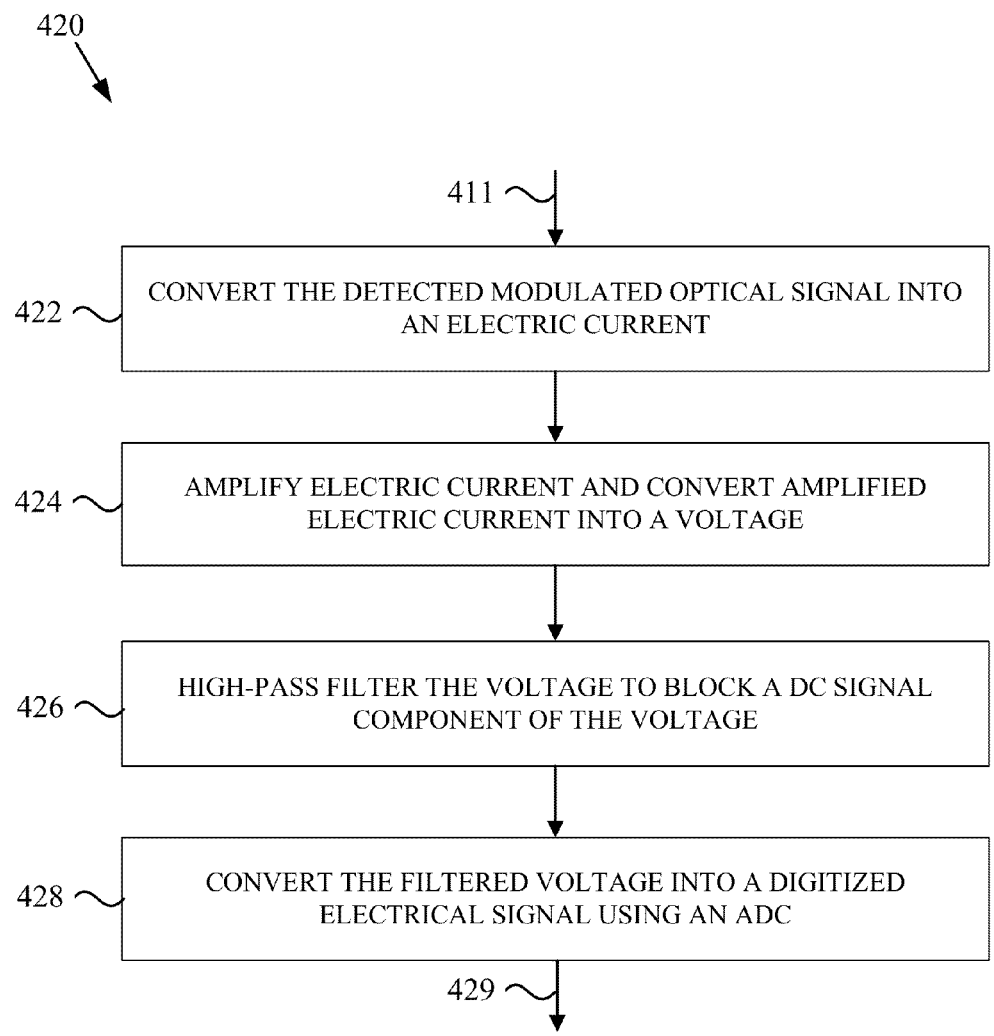
FIG. 8 shows a flowchart of an embodiment of a step for converting the detected modulated optical signal into a digital electrical signal in accordance with the Atmospheric Transmissometer Using a Modulated Optical Source.
Figure 9:
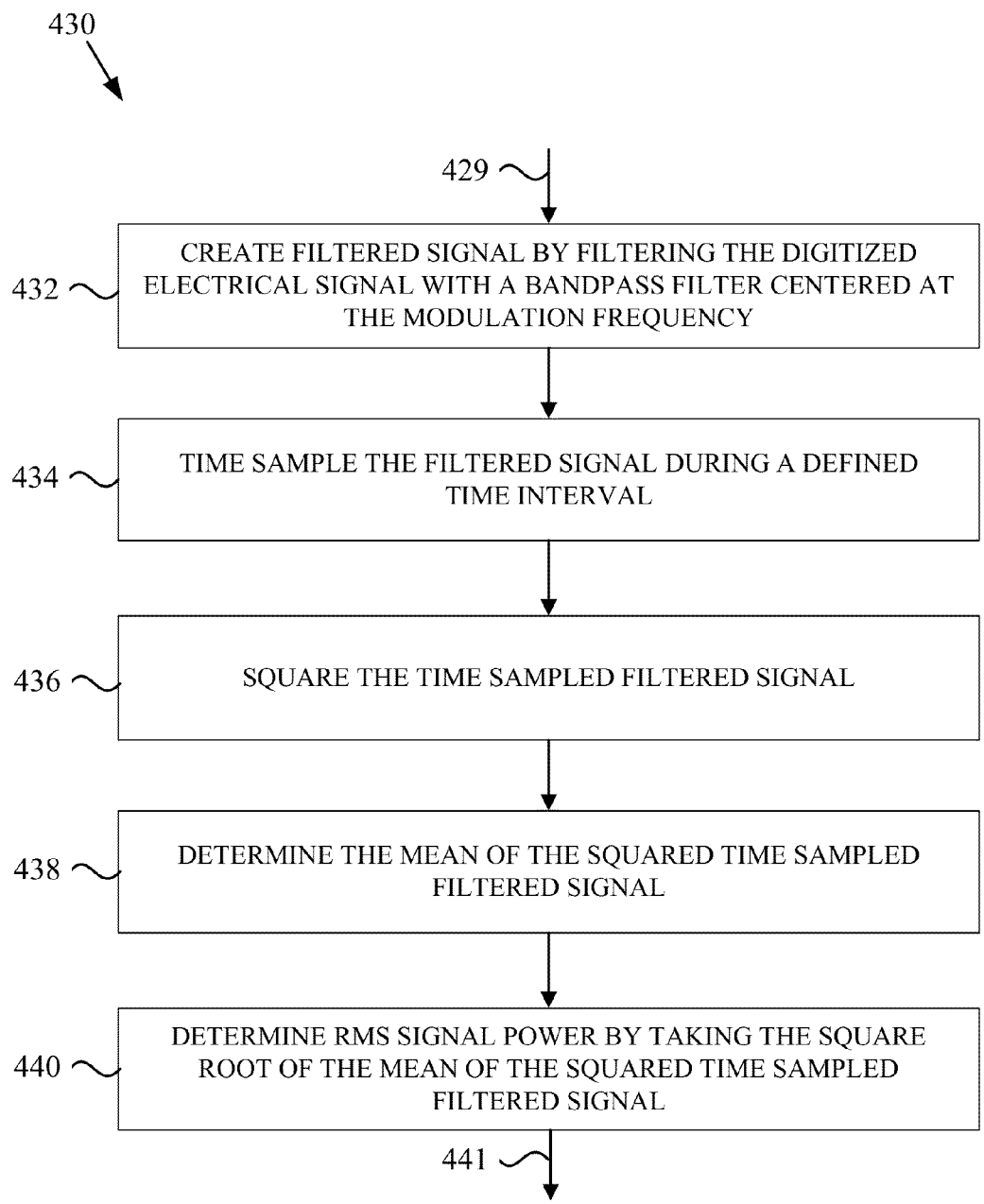
FIG. 9 shows a flowchart of an embodiment of a step for determining the root mean square signal power of an AC component of the digitized electrical signal at the modulation frequency in accordance with the Atmospheric Transmissometer Using a Modulated Optical Source.

FIG. 7 shows a flowchart of an embodiment of a method 400 in accordance with the Atmospheric Transmissometer Using a Modulated Optical Source. As an example, method 400 may be performed by system 10 as shown in FIG. 1 and will be discussed with reference thereto and its respective components. Further, while FIG. 7 shows one embodiment of method 400 to include steps 410-470, other embodiments of method 400 may contain fewer or more steps. Further, while in some embodiments the steps of method 400 may be performed as shown in FIGS. 7-9, in other embodiments the steps may be performed in a different order, or certain steps may occur simultaneously with one or more other steps.

Method 400 may begin at step 410, which involves detecting, using optical detector 50, a modulated optical signal from an atmospheric propagation channel, where the modulated optical signal comprises an optical signal from an optical source modulated, at mixer 20, with a periodic signal at a modulation frequency greater than the bandwidth of the turbulence within the atmospheric propagation channel. As an example, the modulation frequency is greater than about 1 kHz.

Step 420 involves converting the detected modulated optical signal into a digitized electrical signal. As shown in FIG. 8, step 420 begins with step 422, which involves converting the detected modulated optical signal into an electrical current. Step 424 involves amplifying the electrical current and converting the amplified electrical current into a voltage. Step 426 involves high-pass filtering the voltage to block a DC signal component of the voltage. Step 428 involves converting the filtered voltage into the digitized electrical signal using ADC 60.

In some embodiments of method 400, method 400 proceeds to step 430, which involves determining, using atmospheric transmission subsystem 70, the root mean square (RMS) signal power of an AC component of the digitized electrical signal at the modulation frequency. As shown in FIG. 9, step 430 may begin with step 432, which involves creating a filtered signal by filtering the digitized electrical signal with a bandpass filter 72 centered at the modulation frequency. Step 434 involves time-sampling the filtered signal, using time sample processing circuitry 74, during a defined time interval. Step 436 involves squaring the time-sampled filtered signal using RMS processing circuitry 76. Step 438 involves determining the mean of the squared time-sampled filtered signal using RMS processing circuitry 76. Step 440 involves determining the RMS signal power using RMS processing circuitry 76 by taking the square root of the mean of the squared time-sampled filtered signal. In some embodiments, method 400 ends after step 430.

In some embodiments of method 400, method 400 proceeds from step 420 to step 450. Step 450 involves determining the power spectral density (PSD) of the digitized electrical signal using PSD processing circuitry 84. In some embodiments, the digitized electrical signal is averaged and signal conditioning is performed using circuitry 82 prior to determining the PSD of the digitized electrical signal. Step 460 involves using bandpass filter 86 to extract, from the PSD, the magnitude of the peak component at the modulation frequency $f_0$, referred to as $S_{atmos}(f_0)$.

Step 470 involves determining the effective optical depth $\tau_{\it eff}$ of the atmospheric propagation channel using the magnitude of the peak component at the modulation frequency. In some embodiments, $\tau_{\it eff}$ is determined according to the equation $\tau_{eff}=\ln[S_{clear}(f_0)/S_{atmos}(f_0)]$, where $S_{clear}(f_0)$ is the magnitude of a fundamental PSD component from a reference waveform taken in optimal clear-visibility conditions. In some embodiments, step 470 may be performed using optical depth subsystem 80.

Some or all of the steps of method 400 may be stored on a non-transitory computer readable storage medium, wherein the steps are represented by computer readable programming code. The steps of method 400 may also be computer-implemented using a programmable device, such as a computer-based system. Method 400 may comprise instructions that, when loaded into a computer-based system, cause the system to execute the steps of method 400. Method 400 may be implemented using various programming languages, such as "Java", "C", or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself, and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Atmospheric Transmissometer Using a Modulated Optical Source are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A method comprising the steps of:
   detecting a modulated optical signal from an atmospheric propagation channel, wherein the modulated optical signal comprises an optical signal from an optical source modulated with a periodic signal at a modulation frequency greater than the bandwidth of turbulence within the atmospheric propagation channel;
   converting the detected modulated optical signal into a digitized electrical signal;
   determining the power spectral density (PSD) of the digitized electrical signal;
   extracting, from the PSD, the magnitude of the peak component at the modulation frequency $f_0$, referred to as $S_{atmos}(f_0)$; and
   determining the effective optical depth $\tau_{eff}$ of the atmospheric propagation channel using the magnitude of the peak component at the modulation frequency.

2. The method of claim 1, wherein $\tau_{eff}$ is determined according to the equation $\tau_{eff}=\ln[S_{clear}(f_0)/S_{atmos}(f_0)]$, where $S_{clear}(f_0)$ is the magnitude of a fundamental PSD component from a reference waveform taken in optimal clear-visibility conditions.

3. The method of claim 1, wherein the modulation frequency is greater than about 1 kHz.

4. The method of claim 1, wherein the step of converting the detected modulated optical signal into a digitized electrical signal comprises the steps of:
   converting the detected modulated optical signal into an electrical current;
   amplifying the electrical current and converting the amplified electrical current into a voltage;
   high-pass filtering the voltage to block a DC signal component of the voltage; and
   converting the filtered voltage into the digitized electrical signal using an analog-to-digital converter.

5. A method comprising the steps of:
   detecting a modulated optical signal from an atmospheric propagation channel, wherein the modulated optical signal comprises an optical signal from an optical source modulated with a periodic signal at a modulation frequency greater than the bandwidth of turbulence within the atmospheric propagation channel;
   converting the detected modulated optical signal into a digitized electrical signal;
   determining the root mean square (RMS) signal power of an AC component of the digitized electrical signal at the modulation frequency;
   using the determined RMS signal power to determine a received RMS signal power of the detected modulated optical signal at the modulation frequency; and
   determining the transmission of the atmospheric propagation channel by calculating a ratio between the received RMS signal power of the detected modulated optical signal and the expected RMS signal power of the detected modulated optical signal.

6. The method of claim 5, wherein the step of determining the RMS signal power comprises the steps of:
   creating a filtered signal by filtering the digitized electrical signal with a bandpass filter centered at the modulation frequency;
   time-sampling the filtered signal during a defined time interval;
   squaring the time-sampled filtered signal;
   determining the mean of the squared time-sampled filtered signal; and
   determining the RMS signal power by taking the square root of the mean of the squared time-sampled filtered signal.

7. A system comprising:
   a modulator configured to modulate an optical signal from an optical source with a periodic signal at a modulation frequency greater than the bandwidth of turbulence within an atmospheric propagation channel;
   a transmitter configured to propagate the modulated optical signal into the atmospheric propagation channel;
   an optical detector configured to detect the propagated modulated optical signal from the atmospheric propagation channel;
   an AC coupled detector, operatively connected to the optical detector, configured to convert the propagated modulated optical signal into an electrical voltage; and
   an analog-to-digital converter (ADC), operatively connected to the AC coupled detector, configured to digitize the electrical voltage; and
   an optical depth processing subsystem, operatively connected to the ADC, comprising averaging and signal conditioning circuitry, PSD processing circuitry operatively connected to the averaging and signal conditioning circuitry, and a bandpass filter operatively connected to the PSD processing circuitry.

8. The system of claim 7 further comprising an atmospheric transmission processing subsystem operatively connected to the ADC.

9. The system of claim 8, wherein the atmospheric transmission processing subsystem comprises:
   a bandpass filter;
   time sample processing (TSP) circuitry operatively connected to the bandpass filter; and
   root mean square processing circuitry operatively connected to the TSP circuitry.

10. The system of claim 7, wherein the optical detector comprises a telescope with a narrowband optical bandpass filter focused on a detector.

11. The system of claim 7, wherein the optical source is a laser.

12. The system of claim 7, wherein the optical detector comprises an avalanche photodiode.

\* \* \* \* \*